Jan. 5, 1971 R. J. HAMMOND 3,553,080

CIRCUITRY FOR RECORDING AND REPRODUCING VIDEO SIGNAL INFORMATION AS MULTIPLE LIMITED BANDWIDTH SIGNALS

Filed Feb. 21, 1968 2 Sheets-Sheet 1

INVENTOR
ROBERT J. HAMMOND

BY
Kane, Dalsimer, Kane, Sullivan + Smith
ATTORNEYS

INVENTOR
ROBERT J. HAMMOND
BY
Kane, Dalsimer, Kane, Sullivan & Smith
ATTORNEYS

United States Patent Office 3,553,080
Patented Jan. 5, 1971

3,553,080

CIRCUITRY FOR RECORDING AND REPRODUCING VIDEO SIGNAL INFORMATION AS MULTIPLE LIMITED BANDWIDTH SIGNALS

Robert J. Hammond, Stevensville, Mich., assignor to V-M Corporation, Benton Harbor, Mich., a corporation of Michigan Filed Feb. 21, 1968, Ser. No. 707,030
Int. Cl. H04n *5/78, 7/06, 7/12*
U.S. Cl. 178—6 16 Claims

ABSTRACT OF THE DISCLOSURE

This invention relates to signal circuitry and apparatus particularly adapted for providing an intermediate recording of video signal information which may be achieved in various ways, such as electromagnetically, and which under normal conditions because of band width particularly normally could not be accurately recorded due to limitations in the recording element. In its broadest form, the invention provides for translating video signal information into a series of pulses which then are expanded prior to being recorded and subsequent to recording are reconverted into electrical signaling energy from which the video information is later produced.

Figure 1:
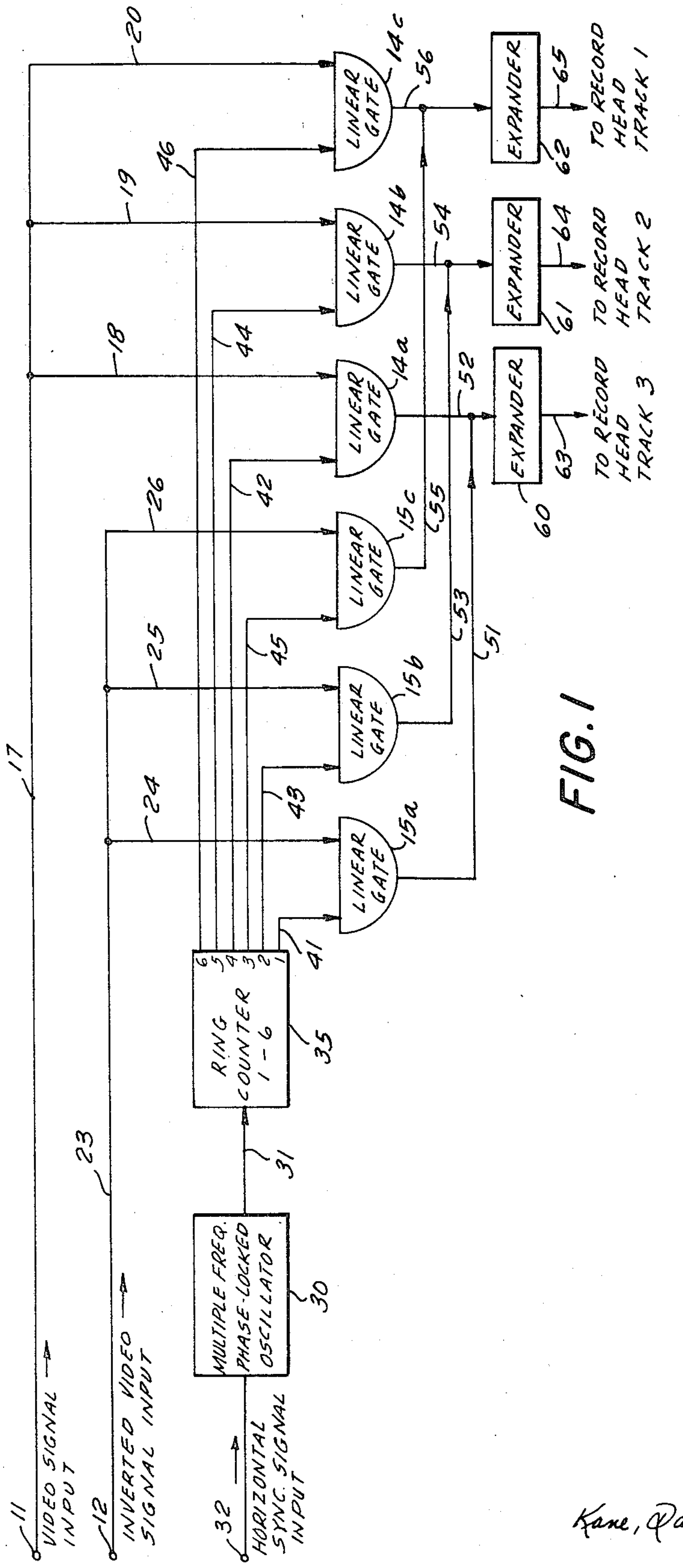

This invention relates to circuitry particularly adapted for recording and playing back television signals at any chosen time. The proposal is directed particularly to ways and means by which the signal band to be recorded may be reduced to a range to which normally used types of devices become responsive without distortion.

For the most part, television signals occupy a relatively wide frequency band wherever the signals contain any substantial amount of detail and where there is a continuity of frame or field repetition at a rate sufficiently high so that through persistence of vision the finally reproduced signal gives the appearance of continuity of observation and is flicker-free.

Normally, in television operations the signal pickup and transmission must follow certain standards which have been fully and thoroughly tested. These standards are required from all transmitting points so that all receiving units will be able to receive signals regardless of the source of their origin. In the United States, it is required that the transmitted television image shall be reproduced per second at a frame rate of thirty. These thirty frames per second are interlaced in a 2:1 relationship of picture fields relative to picture frame. There should be 525 lines of picture per frame. This means that each of the interlaced fields shall consist of 262½ lines of image (signals neglecting blanking which need not here be discussed) with the lines of alternate fields interspersed and uniformly spaced in an orderly fashion. When the signals are so transmitted and the image to be observed bears a general aspect ratio of about 4:3, the theoretical frequency band required for transmission is approximately a modulating range of about 4.5 mHz. However, as a practical matter, the actually displayed video information for home use is usually considered of adequate quality if in the range of between 2.5 mHz. and 3.0 mHz. This disclosure will assume, as a general proposition, that a 2.5 mHz. representation is adequate, and will be based generally on such a premise. This is a frequency range which cannot readily be recorded by any usual electromagnetic storage means. If the recording is to be carried on by recording the image signals upon magnetic tape, for instance, it is very difficult, if not totally impossible at the present time, to record signal frequencies which extend in a range much above 1.0 mHz. without excessive head to tape speeds. This invention makes accurate recording a realization by providing for multiple records each within a frequency range which can readily be handled.

This invention is predicated upon a premise of being able to record an adequate representation for either prompt or subsequent reproduction of television image signals either directly picked up and thus recorded prior to transmission, or picked up and transmitted and recorded concurrently, but separately, or transmitted and recorded even at the different points of reception. While indeed the suggested 2.5 mHz. range inherently results in a loss of resolution, as compared to broadcast standards, in any recording system of this character, it is important that the recording be done in an economic fashion and that such loss of resolution as occurs can be tolerated and that no significant synchronizing problems shall be introduced.

Various schemes have been provided for achieving the intermediate record and included among these are the photographic reproduction of signals from which rescanning can later take place so that the recorded image may be reproduced at either the rate of occurrence or at a faster or slower rate with the speed recording then governed or controlled by the rate at which the image is initially prepared or later rephotographed. The rephotographing process is usually done from a monitor and, therefore, occasionally detail losses there also may often be contemplated.

In other schemes it has been proposed to record for later reproduction according to magnetic principles where the produced signal serves to control the magnetization of a tape record which is coordinated in its rate of motion wtih the rate at which the picture image is produced.

According to the present invention, the recording system may be considered as a pulse amplitude modulation system with track switching so that each track of the image occupies a frequency range well within the limits of the electromagnetic system. To achieve this result, the video signal information is sampled at a rate normally slightly higher than that of the highest frequency transmitted. The sampling is achieved by using the video signal in its normally produced polarity and alsͻ as an inverted polarity video signal. Each video signal is substantially a duplicate of the other except for the fact that each is inverted in polarity relative to the other. Pulse time-base expansion is utilized so that by the combination of the uninverted and the inverted video signal it is possible to record television signals of normal band width as signals of only three channels, each less in frequency width than the limits of recording in the system and each consisting of a series of amplitude modulated generally square wave pulses. The signals are transferred on to a magnetic tape record by any desired form of recording head. Signal pick-up from the formed record is by any suitable reproducing head and at any desired time, although it is important that all records be concurrently transcribed.

Upon being picked up, the recorded signal is normally slightly distorted but of a general sine wave formation. This distortion comes into being largely because of the limitations of the pass band of the recording medium. Amplitude linearity is nonetheless present so that resampling can be provided in each separate channel.

Following the pickup, the slightly distorted sine wave signals are normally appropriately amplified and then rectified to provide a train of amplitude modulated pulses occurring at a rate double that at which the direct video and the inverted video information is placed upon the record strip. Amplitude linearity exists even in this rectified signal form. The slightly distorted sine wave signals after rectification can all be considered as of like polarity appearing sequentially in the resultant signal series.

Because of this fact, the rectified pulses can be resampled in samples as narrow as desired and then all combined to reconstitute and resurrect the original video signal input. Although it is conceivable that some transients in the form of spikes and the like might tend to exit between samples, these distortions are generally beyond the range of the video amplifier pass band, so that the resultant signal which is developed to be reproduced for visual observation will appear in substantially the same form as it would have appeared had the original information been reproduced for observation.

In one particular form of the invention resampling may be carried out without the need of any holding gate. In this case, the samples are taken at the desired width and the slight variations in the amplitude of the incoming signal in the different sample pulses is completely acceptable because of the extremely short time period constituting only a fraction of a microsecond between adjacent pulses.

For the purpose of recreating the final signal, the rectified pulses are triggered with the triggering usually being controlled by the zero crossover point on the center track of the system (assuming, for instance, that three separate tracks of recording are required for reproducing the signal). It is usual then to introduce appropriate time delays to each of the gates of the channel prior to recombining the signals in order that the original video signal information may be derived.

As a statement of the broad principles of this invention, no provisions will be set out herein for any correction of so-called "wow" because of the unlikeliness of such conditions occurring and because the problem, if it should occur, can be solved appropriately by apparatus of known kind and is no different than for direct record. Thus, it is unnecessary to describe or set the general principles as it forms so direct part of the invention involved. "Skew," likewise, will be found to be no problem since, as will be explained, the reproduction will be controlled by the center track of the system.

In the description to follow, it will be appreciated that while certain relationships between switching points, gates, signal inversion and the like have been shown as constituting a preferred form of the invention, these are not limiting factors but the points of connection or switching can be moved as desired as long as the end result remains substantially unchanged.

With the foregoing thoughts in mind, it becomes a principal object of this invention to provide for recording signals of wide frequency band width, such as television signals normally occupying a frequeny band of at least 2.5 mHz., and then to provide for later reconverting the so-recorded signals into a wave train of energy substantially duplicating that originally developed.

Following this plan, it is then an object of this invention to provide for utilizing the secondary wave train developed as the primary signal source from which a new image signal train can be recreated.

Other objects of the invention are to provide through the use of simplified circuitry a magnetic record of video signal which normally extends a substantial number of times beyond the maximum frequency width of normal signal recording possibilities of the record medium upon which the stored record is to be made.

Other objects of the invention are those of providing for recording television image signals of the video information in a simplified fashion on a reduced number of magnetically responsive tracks from which the so-recorded signals can later be picked up for reproduction. With this, there can be combined, if desired, additional separate tracks for recording and later reproducing any accompanying audio information or other information desirable for the control of the final analysis of the reproduction of the video information on an observation screen that is activated in accordance with the signal developed from the pick-up of the stored signal components.

Various other objects and advantages of the invention and various other ways and means by which the invention can be practiced will be apparent from the description herein to follow.

Figure 2:
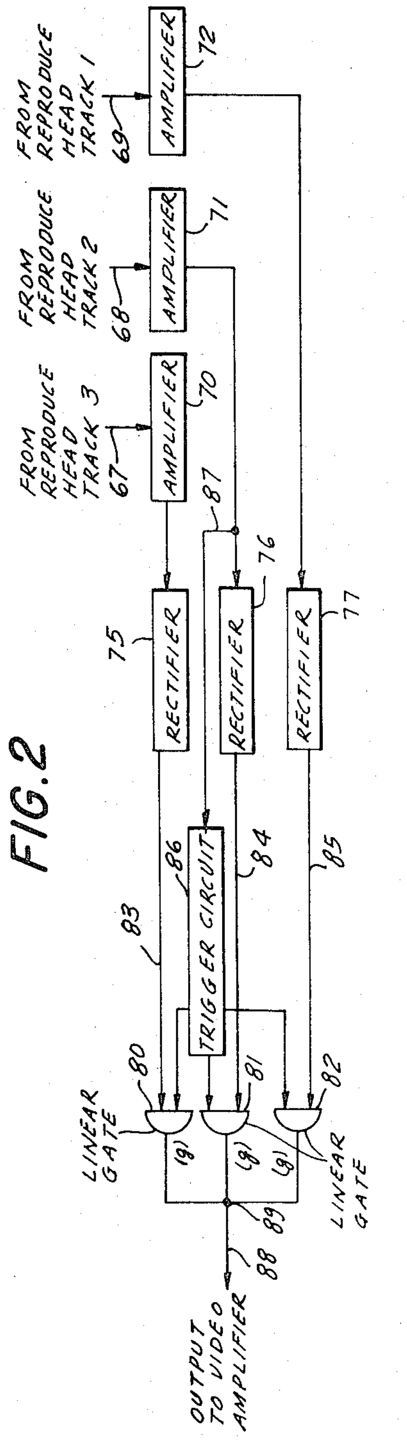
Figure 3:
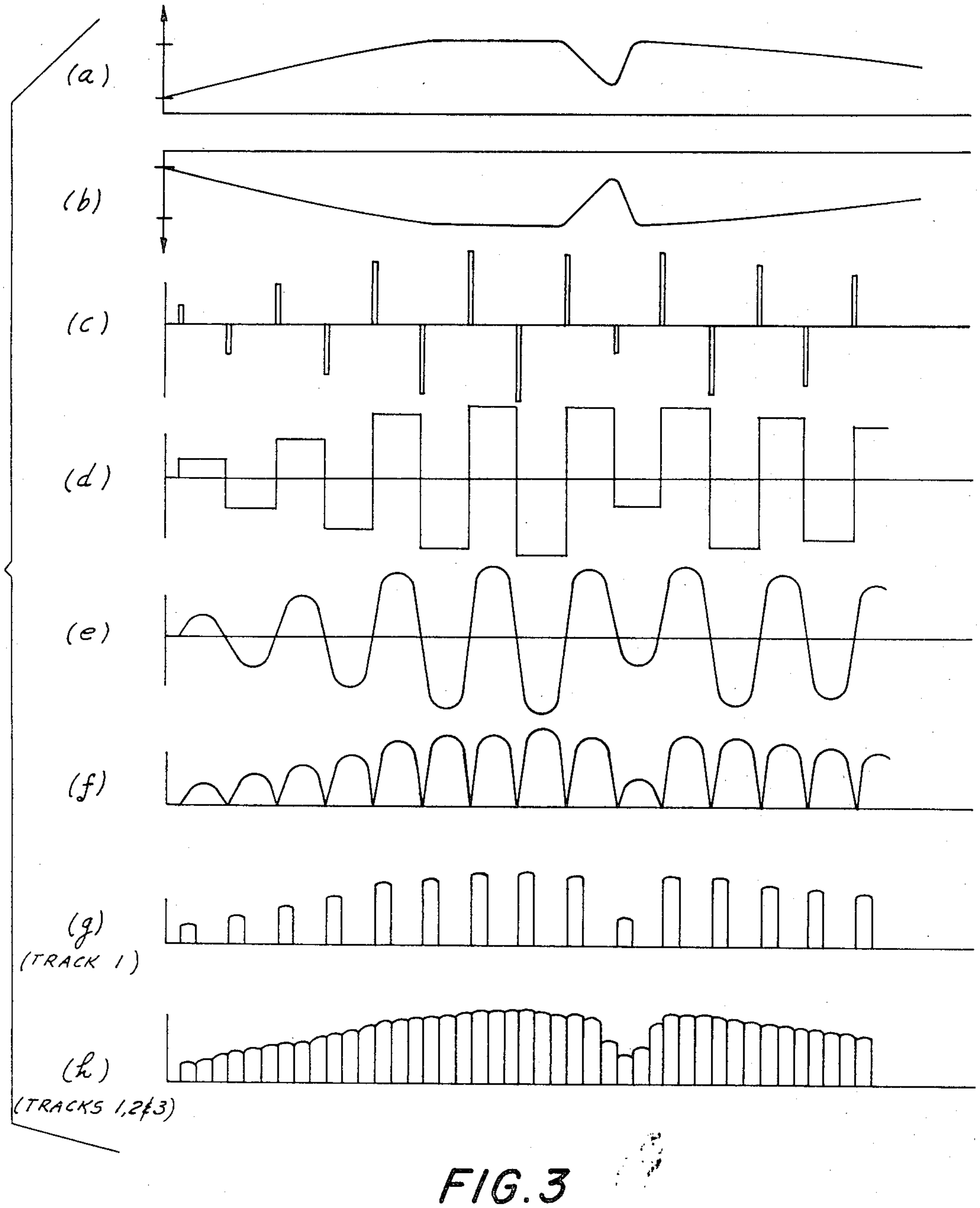

When this description is considered in conjunction with the claims hereinafter appended and the drawings, it shall serve to illustrate schematically one preferred form of the invention. By the drawings, FIG. 1 illustrates in block form the production of a signal series adapted to be fed to a three-channel limited band width recorder or transmission path which may originate at a television camera pickup chain or even a receiver-detector;

FIG. 2 is a schematic diagram, also in block form, which illustrates one preferred form to recreate the original signal after storage; and FIG. 3 is a bracketed series of eight curves (a) through (h) schematically illustrating the operation of the circuit of FIGS. 1 and 2 through the schematic representation of the wave forms at selected points in the schematic circuit diagrams.

If reference is now made to the drawings, and first to FIG. 1, it may be assumed that the same video input signal is supplied both directly and in inverted polarity at the signal input terminals 11 and 12, respectively. These signals are then supplied to a plurality of linear gate circuits **14*a*, 14*b* and 14*c*, or 15*a*, 15*b* and 15*c*, as the case may be. The uninverted video signals are all supplied by way of conductor 17 and then conductors 18, 19 and 20, respectively, to the gate 14*a*, 14*b* or 14*c*. Similarly, the inverted input signals are supplied over conductor 23 and then through conductors 24, 25 or 26 to the gate 15*a*, 15*b* or 15*c***.

The gates **15*a*, 15*b* and 15*c*, as well as the gates 14*a* 14*b* and 14*c***, are all of the additive type, and are of well known character, per se, so that two signals must be present simultaneously at the input to derive any output signal.

While the video signals are being received at terminals 11 and 12, it may be assumed that the oscillator 30 (shown in block form) is generating oscillations at some appropriately chosen frequency which will be substantially higher than that of any video signal present at input terminals 11 and 12. In this instance, and purely as an illustration, it may be assumed that local oscillator 30 generates an output signal, to be available in conductor 31, which can be assumed as 5,402.25 kHz. This oscillator is synchronized and phase-locked, in any desired and known fashion, to the television horizontal or line frequency sync (synchronizing) signal input. By standards now adopted in the United States, these signals, which appear at an input frequency of 15.75 kHz. are supplied at the input terminal 32. At the assumed values, the oscillator 30 generates an output on conductor 31 which is the 343rd harmonic of the input line frequency. This oscillator 30 is thus readily locked in phase with the received sync signal information signal. Its output from conductor 31 is supplied to any desired form of ring counter, schematically shown by the block 35. The counter is shown as developing six input pulses, each 60° apart, for each cycle of input thereto. The separate steps are shown by the numerals 1 through 6 shown adjacent to its six output conductors 41 through 46 so that gates **15*a*, 15*b*, 15*c*, 14*a*, 14*b* and 14*c*, to which these outputs connect, as shown by FIG. 1, through conductors 41, 43, 45, 42, 44 and 46, respectively, provide the control. The gates open momentarily (each of about 0.2 microsecond in the named order). Thus, gate 14*b*, for instance, could provide an output signal on its output conductor 54 whenever input pulse signals of like polarity are present on its input conductors 19 and 44**.

While the ring counter operates so that there is only one output at each gate terminal at any time so that only one gate is conducting, the polarity of the signal instantaneously present on conductors 41 and 42 will be opposite. Likewise, this is true as regards conductors 43 and 44 as well as conductors 45 and 46.

The outputs from gates **14*a* and 15*a* are supplied through a common input to expander circuit 60. Outputs from gates 15*b* and 14*b* activate expander circuit 61, and expander circuit 62 is supplied from the outputs of gates 14*c* and 15*c* as on conductors 56 and 55**.

The general form of wave input at terminals 11 and 12 is diagrammed by FIG. 3 (portions "*a*" and "*b*").

Since the counter 35 has its outputs on conductors 41 and 42, 180° apart, the voltages here are opposite. The pulses shown by curve "*c*" of FIG. 3 can be considered as the inputs to expander 60 as derived from conductors 52 and 51 from linear gates **15*a* and 14*a***, respectively. The first pulse, for instance, is a 0.2 microsecond pulse of curve (*a*). During the next assumed period of 0.4 microsecond, samples are taken from other gates for other tracks. The second sample shown by curve (*c*) would be from curve (*b*) by one of the two gates feeding this expander. Thus, curve (*c*) shows the pulses from gates **14*a* and 15*a* fed to expander 60**.

The peaks of all the pulses in curve "*c*" of FIG. 3 thus represent, for instance, only gates **15*a* and 14*a***. It will be seen how closely the curves of parts (*a*) and (*b*) would be if pulses from the other gates were shown. If other pulses were shown it would not be difficult to envision an imaginary line and the envelope of the input video signal at terminals 11 and 12 as represented by the pulse peaks. For the assumed condition, the pulses shown by curve "*c*" of FIG. 3 of the input video information are reduced in frequency compared to the signal present at the input terminals. The samples are taken, in the assumed example, at a 5.4 mHz. rate, so that the maximum video frequency that can be sampled is 2.7 mHz. This frequency then, as will be shown from what is to follow, is processed into three channels each of a band width of 0.9 mHz.

This is a frequency value which is well within the range which can be recorded electromagnetically on a tape record under the conditions previously stated. The showing of curve "*d*" of FIG. 3 clearly shows that the pulse output of each expander unit represents a substantially expansion of the input pulse.

The separate expander outputs are supplied by way of conductors 63, 64 and 65 to control the operation of several magnetic recording heads of any known type (consequently not shown for reason of simplicity of illustration) thereby to provide electromagnetic records on magnetic recording tapes, disks or the like (also not shown for simplicity) with which each head is associated. A plurality of records is thus provided (one record for each head). As above stated, this electromagnetic record may be the only record made, or it may be provided as an auxiliary record formed concurrently with the video signal and it may be used as a prompt or delayed replay of the video information.

After the recording has been made from the signal information available on any or all of conductors 63, 64 and 65, the so-recorded data is first usable to recreate a video image after there has been a pickup thereof, or a translation thereof into an electrical signal, by suitable pickup heads. These heads likewise are not illustrated as they can be of any well known form suitable to translate the magnetic record into one of an electrical type, which signals are then available from the separate record tracks on conductors 67, 68 and/or 69. The conductors 67, 68 and 69 connect to suitable amplifiers 70, 71 and 72.

It has been found that while the recorded signals (as shown at curve "*d*" of FIG. 3) provide generally (for the example given) three separate channels of approximately 0.9 mHz. amplitude modulated generally square shaped waves, there is, upon playback, a slight distortion in the wave. This produces a curve which is schematically shown by curve "*e*" of FIG. 3 and although it is a curve of substantially the same frequency range as the square wave of curve "*d*" the distortion to more like a sine wave form comes into being due to the approximate 1 mHz. pass band which can be assumed for the recorder.

The amplifiers 70, 71 and 72 connect, respectively, to rectifiers of any known type which are represented in block form at 75, 76 and 77, respectively. With rectification, the wave form depicted by curve "*d*" of FIG. 3 then becomes a train of amplitude modulated pulses (as by curve "*f*" of FIG. 3) which occur at a 1.8 mHz. rate for the assumed example.

Amplitude linearity is retained, however, which makes resampling of these pulses a relatively simple problem. This is shown by diagram by curve "*g*" of FIG. 3. Then, if the samples are recombined the video input can be reconstructed.

This is achieved by supplying the outputs from rectifiers 75, 76 and 77 to separate linear adding gates 80, 81 and 82 by way of conductors 83, 84 and 85. As the system is shown by diagram, it may be noted that there is an absence of any holding gate. The linear gates are controlled from a separate trigger circuit 86 for which the trigger pulses are derived by way of conductor 87 from the zero crossover point (in this instance) on the center track as provided by the output of amplifier 71. Appropriate delays between the trigger circuit and the various linear gate amplifiers are introduced through any well known form of delay circuit (not shown) so that the gates 80, 81 and 82 as supplied from the several amplifiers 70, 71 and 72 all open in the desired sequence when the input signals from the trigger 86 and the second input signal are of the same polarity.

The samples which will be taken of the picked-up signals which appear at the output of the amplifiers 70, 71 and 72 are then all taken at the desired width and for this illustrated condition the slight variation in amplitude over the 0.18 microsecond time period is quite acceptable.

The output from the various gates 80, 81 and 82 all combine at the common output connection 89 and feed to conductor 88 which, in turn, is connected to any suitable video amplifier (not shown) to recreate the image as desired.

The circuitry above described and shown substantially by diagrammatic representations makes no provision for correction of the so-called "wow" or skew. In the described circuits, the problem is largely nonexistent. Therefore, the sampling and resampling taken without the use of a holding gate under control of the trigger pulses, such as those developed by the trigger circuit 86, gives the necessary type of signal information on the output conductor 88. The various wave forms as they are provided are then combined on the conductor 88 with the pulses properly interspersed one with the other as indicated. It will be appreciated, of course, that by curve "*g*" of FIG. 3 there is illustrated, by way of example, the output of only one of the linear gates 80, 81 or 82 so that at the point 89 where the signals are fed to the output conductor 88 the various linear gates 80, 81 and 82 can add together to provide the signal train indicated by curve "*h*" of FIG. 3.

The wave form chart of FIG. 3 shows one particularly satisfactory method of handling the signal. The block diagram illustration is supplied throughout because the separate types of components are generally well known. It is to be understood, however, that while the diagram does show a preferred form of the invention, nonetheless the various switching points, the gates, the signal inverters and the like can be moved so long as the end results remain unchanged and so long as the signal output is approximately as indicated. Illustratively, it may be assumed that curve "*g*" of FIG. 3 represents the resampled pulses for that part of the signal channels which is developed from the expander 60 and then resampled in the linear gate 80 as controlled by the input along conductor 83 from rectifier 75 and triggered by the connection of the gate to the trigger circuit 86. In part "*h*" of FIG. 3, it can be seen that numerous samples are placed substantially adjacent to each other. The samples which intervene between those corresponding to what is shown by curve "*g*" are the samples which result from the outputs of the linear gates 81 and 82, respectively, controlled in the fashion already explained for gate 80. For these conditions, it can then be appreciated at once that the curve representing the tops of the pulses in portion "*h*" of FIG. 3 then is substantially a duplicate of the envelope shown by curve "*a*" of this same figure.

From the foregoing, it can be seen that the video signal information comprises both a positive and a negative representation of the available signal from some suitable input source. This video signal information is then supplied so that the positive and negative signal portions serve as inputs to selected gating circuits. The gating circuits are sequentially and alternately activated by the developed control pulses, as generated, illustratively, by a counter that is synchronized under the control of sync information that accompanies the video signals. This gating provides a sequence of pulse output signals of a duration corresponding to that of each counter signal, with each successive pulse alternating in polarity between the selected positive and negative signal representations. Following this pulse development, the signals are expanded and then stored. The storage is conveniently provided by utilizing the developed signal information to control the development in expanded form of control signals for activating electromagnetic instrumentalities serving to provide a series of electromagnetic records, each of which is of a band width only fractionally related to the initial video signal in the ratio which the number of control pulses developed per unit time period bears to the band width of the available video signal.

Following this, at any selected time period, suitable electromagnetic transducers (not shown) may reconvert the stored electromagnetic energy into electrical signals which are rectified (subsequent to amplification, if desired or necessary). These recovered signals are supplied to other gating circuits in the process of reproducing the original signal. The gating circuits are controlled in sequence by a suitable triggering pulse operation, with it being simplest usually to develop the control from any one of the stored signals at the time it passes through a state of zero amplitude, for instance, as being reconverted into electrical energy. The output of the gating circuits becomes a sequence of rectified signals occurring in an order corresponding essentially to the change in amplitude of the initially provided video signal. This thus produces a signal output which is essentially a duplicate of the initially applied signal information.

Various modifications, of course, may be relied upon and while electromagnetic storage of the expanded pulse information is suggested as one convenient form of storage of the signal information, it is apparent that here especially suitable modifications may be chosen. Illustratively, instead of producing the electromagnetic signal representation, the expanded input signals may serve to activate a suitable light producing element which causes a response upon a light sensitive film record, with the response also being proportional to the selected expanded signal pulse information. In retranslating the information, light sensitive elements in the form of photoelectric transducers, for instance, may provide the electrical signal information corresponding to that originally stored.

Still other modifications will at once suggest themselves to those skilled in the art to which the invention is directed when the invention is considered in conjunction with the foregoing description and the claims that follow.

Having now described the invention, what is claimed is:

1. A circuit for recreating signals from video signals transmitted over a wide frequency band adapted to be controlled by synchronizing information identifying each of line and field positions of the signal origin which comprises a local oscillator, means to stabilize the oscillator frequency under control of received synchronizing information, a counter circuit for producing a sequence of equally spaced control signals, means to supply the video signals simultaneously to the apparatus in both normal and inverted polarity, a plurality of gate circuits of a number corresponding to the separate counter steps developed, means to supply the normal video signals to one-half of the gate circuits and to supply the inverted video signals to the other half of the gate circuits simultaneously, a plurality of signal expander circuits of a number corresponding to the number of recording channels into which it is desired to divide the video signals, means to develop output signals from each gate circuit only at time periods of coincidence of video and counter circuit inputs thereto, connections between the outputs of the individual gates to the expander circuits such that each expander circuti receives in sequence both a normal and an inverted video signal and so that each expander circuit receives different signals from each other expander circuit, and means to store the output of each separate expander circuit.

2. The circuit claimed in claim 1 comprising, in addition, pickup means to recover each expanded and stored signal from the storage means, means for rectifying each of the signals following signal pickup from the storage means, means for resampling the rectified signals in the order in which they are supplied into the expanding circuits, and means for combining the resampled signals in the sequence initially, thereby to reproduce the original video signal.

3. The circuit claimed in claim 1 comprising, in addition, transducer means for recording the expanded video signals under control of the synchronizing information upon a magnetic record.

4. The circuit claimed in claim 1 comprising, in addition, transducer means for converting recorded signal information into electrical signals adapted to be supplied as an input to the rectifying means and including, in addition, means to control the trigger circuit from one of the recreated signals to develop the final signal combination.

5. The signal circuit claimed in claim 4 comprising, in addition, means to control the trigger circuit at time periods when the controlling recreating signal is of zero amplitude.

6. The circuit claimed in claim 1 comprising, in addition, electromagnetic means to store the expanded signals following expansion, and means to convert the stored signals into a series of video signals assimilating the originally received signal.

7. The circuit claimed in claim 6 comprising, in addition, pickup means to recover each expanded and stored signal from the storage means, means for rectifying each of the signals following signal pickup from the storage means, means for resampling the rectified signals in the order in which they are supplied into the expanding circuits, and means for combining the resampled signals in same sequence, thereby to reproduce the original video signal.

8. The circuit claimed in claim 7 comprising, in addition, means to recreate a signal series from the recorded signals, means for rectifying each of the recovered signals, means for resampling the rectified signals in the order in which they are supplied into the expanding circuits, and means for combining the resampled signals in sequence, thereby to reproduce the original video signal.

9. A circuit for recreating signals from video signals transmitted over a wide frequency band accompanied by synchronizing information identifying each of line and field positions of the signal origin which comprises oscillator means for generating oscillations at a frequency substantially higher than that of any video signal, means to lock the oscillator means to a stable harmonic frequency under control of the line synchronizing information, a ring counter circuit controlled from the oscillator means and having a sequence of equally spaced output signals, receiving means to receive the video signals and to provide therefrom both normal and inverted polarity signals in sequence, a plurality of gate circuits of a number corresponding to the separate steps of the ring counter, means to supply the normal video signals to one-half of the gate circuits and to supply the inverted video signals to the other half of the gate circuits simultaneously, a plurality of expander circuits of a number corresponding to the number of recording channels into which it is desired to divide the video signals, a connection between each individual gate and one of the expander circuits, a circuit connection to each gate from the counter circuit to open the gates in sequence at each step of the counter thereby to provide continuously sampled output of the video signals alternating in inverted and uninverted characteristics with each sample representing the video signal at the instant of each step in the gate opening so that each expander output represents an expanded version of the sampled portion of the complete video input signals supplied to the expander circuits for sampling, means for amplifying and rectifying each of the signals following signal expansion, means for resampling the rectified signals in the order in which they are supplied into the expanding circuits, and means for combining the resampled signals in sequence, thereby to reproduce the original video signal.

10. The circuit claimed in claim 9 comprising, in addition, means to store the expanded signals following expansion, and means to translate the stored signals into a second signal series prior to amplification and rectification.

11. A circuit for recreating signals from video signals transmitted over a wide frequency band adapted to be controlled by synchronizing information identifying each of line and field positions of the signal origin which comprises means for generating oscillations at a frequency substantially higher than that of any video signal, means to stabilize the oscillator frequency under control of the line synchronizing information, a ring counter circuit for producing a sequence of equally spaced control signals, means to supply the video signals simultaneously to the apparatus in both normal and inverted polarity, a plurality of gate circuits of a number corresponding to the separate steps of the ring counter, means to supply the normal video signals to one-half of the gate circuits and to supply the inverted video signals to the other half of the gate circuits simultaneously, a plurality of expander circuits of a number corresponding to the number of recording channels into which it is desired to divide the video signals, means to develop output signals from each gate circuit only at time periods of coincidence of video and counter circuit inputs thereto, connections between the outputs of the individual gates to the expander circuits such that each expander circuit receives the normal and the adjacent inverted video signals and so that each expander circuit receives different signals from each other expander circuit, and means to store the output of each separate expander circuit.

12. A circuit for recording signals from developed video signals occupying a wide frequency band accompanied by synchronizing information identifying at least the line position of an image to be produced therefrom which comprises oscillator means for generating oscillations at a frequency harmonically related to the line frequency and higher than the video signals, means to stabilize the oscillator means under control of the line synchronizing information, a counter circuit controlled from the oscillator means and having a sequence of equally time-spaced output signals, means to develop both normal and inverted polarity signals in sequence from the video signals, a plurality of gate circuits of a number corresponding to the separate steps of the counter, means to supply the normal video signals to one-half of the gate circuits and to supply the inverted video signals to the other half of the gate circuits simultaneously, a plurality of expander circuits of a number corresponding to the number of recording channels into which it is desired to divide the video signals, a connection between each individual gate and one of the expander circuits, a circuit connection to each gate from the counter circuit to open the gates in sequence at each step of the counter thereby to provide a continuously sampled output of the video signals alternating in inverted and uninverted characteristics, with each sample representing the video signal at the instant of each step in the gate opening so that each expander output represents an expanded version of the sampled portion of the complete video input signals supplied to the expander circuits for sampling, and means to record the separate signals.

13. The circuit claimed in claim 12 comprising, in addition, means to store the expanded signals following expansion, and means to translate the stored signals into a second signal series prior to rectification.

14. A method for recreating video signals from other video signals transmitted over a wide frequency band where the recreated signals are adapted to be controlled by synchronizing information identifying the original signals which comprises the steps of locally generating oscillations at a harmonic frequency of the line synchronizing signal information available, stabilizing the local generation of oscillations under the control of the received synchronizing information, generating from the received video signal information a second series of video signals of substantially duplicate characteristics to the first signal but inverted polarity, generating locally a series of control pulses each equally spaced from the other in time, gating the received video signal information and the inverted video signal information so that the locally generated control pulses alternately produce from the video information pulses instantaneously indicative of a minor fraction only thereof and of an amplitude accurately representing that at the spaced time intervals relative to the other by the control pulses, expanding each of the developed pulses of video information, and then storing separately each expanded signal.

15. The method steps claimed in claim 14 wherein the storage of the separate signals provides an electromagnetic record.

16. The method of recreating video signal information from prerecorded expanded video signal pulse records as claimed in claim 15 comprising, in addition, the steps of translating the electromagnetic record into a series of electrical signals, rectifying each of the produced electrical signals, combining all of the produced electrical signals subsequent to rectification, and triggering all of the rectified signals as they combine so that the combined signals represent a series of selected signal pulses only and the combined series of signals places all selected signals in an order corresponding in time with the time of development of the original video signal.

References Cited

UNITED STATES PATENTS

| | | | |
|---|---|---|---|
| 2,867,685 | 1/1959 | Johnson | 178—6.6A |
| 3,262,104 | 7/1966 | Clynes | 179—15.55 |
| 3,274,341 | 9/1966 | Allen | 179—15.55 |
| 3,361,877 | 1/1968 | Kreer | 179—15.55 |
| 3,403,231 | 9/1968 | Slaton | 179—100.2 |

ROBERT L. GRIFFIN, Primary Examiner

H. W. BRITTON, Assistant Examiner

U.S. Cl. X.R.

178—6.6; 179—15.55; 325—59